Dec. 28, 1926.
E. KOEHNHORN
AUTOMATIC REGULATION
Filed August 11, 1925
1,612,445
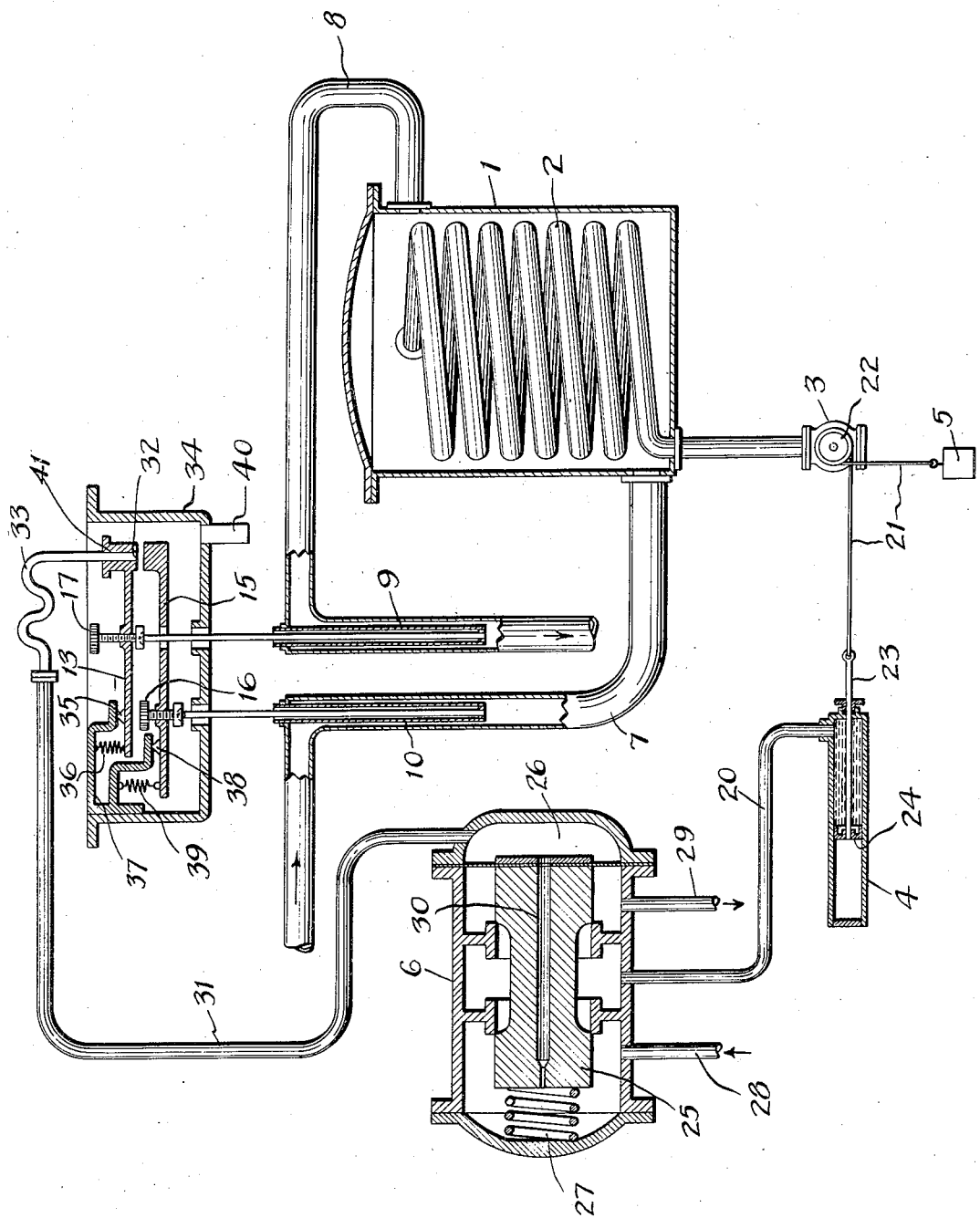
INVENTOR
Erwin Koehnhorn
BY Wm. T. Hedlund
his ATTORNEY Patented Dec. 28, 1926.

1,612,445

UNITED STATES PATENT OFFICE.

ERWIN KOEHNHORN, OF BERLIN, GERMANY, ASSIGNOR TO ARCA REGULATORS, INCORPORATED, OF NEW YORK, N. Y., A CORPORATION OF VIRGINIA.

AUTOMATIC REGULATION.

Application filed August 11, 1925, Serial No. 49,509, and in Germany September 26, 1924.

My invention relates to regulation, more particularly to temperature regulation and still more particularly to regulation of the type wherein a continuously flowing stream of liquid is checked by a member moved in response to an impulse in that which is to be controlled or some impulse having a relation to that which is to be controlled.

One object of my invention is to provide means for maintaining a constant differential of temperature.

A further object of my invention is to provide a novel construction of relay for regulators of the type embodying a continuously flowing stream of liquid.

Further objects of my invention will be apparent as the description proceeds, which will be given with reference to the accompanying drawing showing one embodiment of my invention.

In the accompanying drawing numeral 1 designates a vessel containing a substance to be heated. The heating is accomplished by means of a coil 2 containing any suitable heating medium, for example, steam. The flow of heating medium through coil 2 is regulated by a valve 3 which is controlled by a servo-motor including a cylinder 4 containing a movable piston 24. The piston is acted upon by the pressure of a liquid supplied thereto or released therefrom through a conduit 20. Opposed to the pressure of liquid in cylinder 4 is a counter-weight 5 attached to a flexible member 21 passing over a pulley 22 attached to the valve stem of valve 3 and attached to piston rod 23, which latter is attached to the servo-motor piston 24. Flow of liquid through conduit 20 is controlled by pilot valve 25 which is moved by the pressure of liquid in chamber 26 opposed to which is the force of spring 27. Pilot valve 25 establishes a communication either between conduit 20 and a supply conduit 28 connected with a source of liquid under pressure or between conduit 20 and a waste conduit 29. Supply conduit 28 is connected by means of a narrow restricted passageway 30, passing through the center of the pilot valve with chamber 26.

A conduit 31 connects chamber 26 with a nozzle opening 32 constituting the lower end of a channel 41 situated in a movable lever 13. The lever 13 being movable, a section of conduit 31 indicated at 33 is made flexible. Outflow through nozzle 32 into relay housing 34, which is at atmospheric pressure is controlled by a second lever 15 which acts as a baffling member to outflow of liquid through nozzle 32. Lever 13 is pivoted at 35 and is acted upon by a spring 36 acting between the lever and a fixed standard 37. Lever 15 is pivoted at 38 and is acted upon by a spring 39. Liquid discharging into housing 34 flows out through discharge 40.

Movement of levers 13 and 15 is controlled by thermostats 9 and 10 respectively. The thermostat 9 is placed in the outlet conduit 8 leading from vessel 1. Thermostat 10 is situated in the inlet conduit 7 which supplies the substance to be heated to the vessel 1. Each of the thermostats comprises an outer expansible tube and an inner less expansible rod.

The operation is as follows:

Suppose the temperature of the substance supplied through conduit 7 increases, while the temperature of the substance leaving through conduit 8 remains constant. Thermostat 10 then expands and allows the right hand end of lever 15, as shown, under the action of spring 39 to move downwardly, whereby a greater outflow through nozzle 32 takes place, and pressure in chamber 26 is decreased. Due to the preponderating force of spring 27, pilot valve 25 then moves to the right, effecting communication between conduits 20 and 29, whereby pressure is released in cylinder 4 and piston 24 moves to the right. Valve 3 is then opened somewhat, thereby increasing the supply of heat to the substance in vessel 1, so that the temperature of the substance leaving vessel 1 is increased and the desired differential of temperature is obtained.

Should the temperature in the conduit 8 increase at the same rate that the temperature in conduit 7 increases, the two levers will be moved, each, the same amount, so that they will have no relative movement and no movement of valve 36 takes place.

Should the temperature in the outlet conduit 8 increase the right hand end of lever 13 will be moved downwardly, and assuming no movement of lever 15, less flow takes place through nozzle opening 32 wherefore a greater pressure occurs in chamber 26, pilot valve 25 is moved to the left, as shown, and communication is established between supply conduit 28 and conduit 20 as a result of which, pressure liquid is admitted to cylinder 4, and valve 3 is closed more or less, thus decreasing the amount of heat supplied.

It will thus be seen that the two thermostats 9 and 10 act to maintain a constant difference of temperatures between the substance in outlet conduit 8 and supply conduit 7.

By means of set-screws 16 and 17, the value of the differential may be altered and adjusted.

Obviously the arrangement may be reversed in that the substance in conduits 7 and 8 may be the heating medium and the substance in coil 2 may be the heated medium.

Various arrangements are obviously possible within the scope of the invention which is therefore not limited to the embodiment shown.

What I claim is:

1. A relay for regulators comprising a member movable in response to an impulse in a medium to be affected, said relay having a space open to atmospheric pressure, a channel for fluid movable with said member and discharging a continuously flowing stream of fluid into said space, and a second member movable in response to an impulse in a medium to be affected and adapted to control flow through said channel.

2. A relay for regulators comprising a lever, a channel for fluid movable with said lever, and a second lever adapted to control flow through said channel.

3. A relay for regulators comprising a lever, a channel for liquid passing through said lever, means to supply liquid to one end of said channel, the other end being open and continuously discharging a stream of liquid, a second lever adapted to throttle the stream of liquid and means to rock said levers.

4. In combination, a conduit, temperature responsive means situated at two different points in said conduit, a heat transfer apparatus in heat exchange relation to said conduit intermediate said points and means to control the rate of heat exchange in accordance with the differential action of said temperature responsive means.

5. In combination, a conduit, means responsive to the temperature at two different points in said conduit, a heat transfer apparatus in heat exchange relation to said conduit intermediate said points, a continuously flowing stream of liquid controlled by said means and means to control the rate of heat exchange in accordance with changes of pressure in said stream of liquid.

6. Temperature control apparatus comprising a valve, a liquid pressure operated servo-motor to control the position of said valve, a pilot valve to control flow of liquid to and from said servo-motor, a relay comprising a movable nozzle discharging a continuously flowing stream of liquid, a movable baffling member to control outflow through said nozzle, a thermostat to move said nozzle and a thermostat to move said baffling member.

7. Temperature control apparatus comprising a main control member, a liquid pressure operated actuating means to control the position of said main control member, a movable lever, a channel for liquid movable with said lever, means to conduct liquid from the liquid pressure operated actuating means to said channel, a second movable lever, means associated with said second lever to control outflow of liquid from said channel, a thermostat acting to move each lever, a spring for each lever acting against the force of the thermostats, the thermostats being so arranged that equal rise of temperature maintains the flow through said channel constant.

In testimony whereof I affix my signature.

ERWIN KOEHNHORN.